1

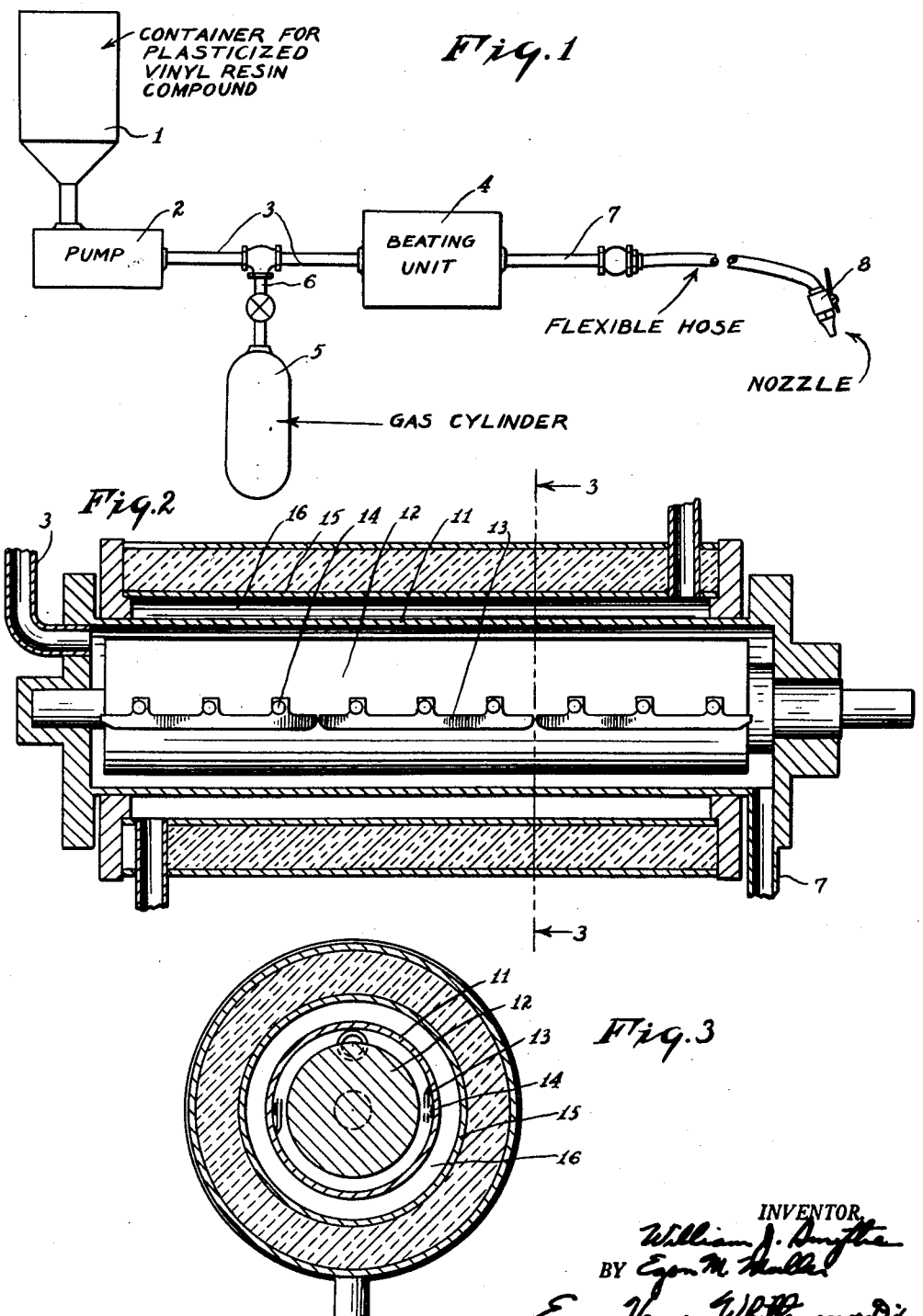

2,917,473

METHODS OF PRODUCING A CELLULAR STRUCTURE IN A PLASTICIZED VINYL ESTER RESIN

William J. Smythe, Ridgewood, N.J., and Egon M. Muller, Hastings on Hudson, N.Y., assignors to Union Carbide Corporation, a corporation of New York Application November 12, 1958, Serial No. 774,573

6 Claims. (Cl. 260—2.5)

This invention relates to methods of producing a cellular structure in an uncured plasticized vinyl ester resin which may be caused to absorb an inert gas while held within a closed system, and may then be discharged in an ungelled state to form an expanded, creamy foam. Such foam may then be cured in a variety of ways to form finished, cured cellular vinyl resin products sometimes known as vinyl foam or vinyl sponge.

This application is a continuation-in-part of our prior filed application Serial No. 482,742, filed January 19, 1955, now abandoned, which was a continuation-in-part of our prior application Serial No. 408,434, filed February 5, 1954, now abandoned.

U.S. Patent No. 2,666,036, dated January 12, 1954, discloses a method of producing such cellular structures in an uncured vinyl ester resin in which relatively high pressures (in excess of 100 lbs. per sq. in.) are applied to cause an inert gas such as carbon dioxide to be absorbed into the plasticized resin. Absorption of gas is facilitated by exposing large surface areas of the plasticized resin thereto, and when the gas impregnated plasticized resin is discharged to atmospheric pressure, some of the absorbed gas is released to form tiny gas cells which result in an expanded, creamy foam.

It is an object of the present invention to provide a method of producing an uncured, expanded, creamy vinyl resin foam in many respects similar to that produced by the patented process, but in which at least a portion of the gas is caused to be absorbed by the plasticized resin by a mechanical whipping or beating action, aided, as and and to the extent desired, by the application of gas pressure.

Other objects and advantages of the invention will appear hereinafter.

A preferred embodiment of the invention selected for purposes of illustration is shown in the accompanying drawings, in which, Figure 1 is a flow diagram.

Figure 2 is a longitudinal section through the beating or whipping unit.

Figure 3 is a transverse section through the same.

The invention is illustrated as applied to a continuous operation in which a free flowing mass of plasticized vinyl resin is moved through a closed system from a source of supply to a discharge nozzle through which it is discharged to form an expanded, creamy foam. Thus the mass of plasticized resin is first moved from a container 1 by a suitable positive pressure pump 2 through a pipe 3 to a beating or whipping unit 4. A suitable gas, preferably carbon dioxide, is introduced under pressure from a suitable source, such as the ordinary pressure cylinder 5, through pipe 6 which is joined to pipe 3 between pump 2 and unit 4. Then the combination of pump pressure and gas pressure moves the plasticized resin through the pipe 3, unit 4 and pipe 7 which leads to a discharge nozzle 8 from which it is discharged in ungelled state to form an expanded, creamy foam.

2

The gas entering the pipe 3 is not intimately or uniformly admixed with the resin at that point, although some absorption of gas will occur, to an extent depending on the pressure in the system. A large portion of the gas is not absorbed, however, but is carried along with the resin in the form of relatively large bubbles. In this form it enters the beating or whipping unit 4, which may be of any suitable nature, in which the material is subjected to a mechanical beating or whipping action of sufficient severity to break up the large gas bubbles and to disperse the unabsorbed gas throughout the liquid in the form of very minute gas cells which are entrained in the liquid.

A preferred form of beating or whipping unit which is readily available commercially is illustrated in Figs. 2 and 3, comprising a cylinder 11, one end of which is connected to the inlet pipe 3 and the other end of which is connected to outlet pipe 7, so that the material moves lengthwise through the cylinder. Mounted within the cylinder is a rotor 12 which may be rotated by an electric motor or any other suitable source of power. The rotor carries blades 13 mounted on studs 14 projecting from the periphery of the rotor, and as the rotor rotates, the blades beat or whip the liquid and gas bubbles to break up the bubbles and disperse the gas throughout the liquid as previously described. In so doing, the work done on the material and the breaking up of the large bubbles into very minute ones also has the effect of increasing very greatly the surface area of liquid exposed to gas, so that gas absorption is facilitated and again proceeds to an extent determined by the pressure maintained in the system.

Thus, the mechanical beating or whipping step has many advantages in practical manufacturing operations, for when utilized in connection with the patented process above referred to in which pressures in excess of 100 lbs. per sq. in. are used to cause substantial gas absorption, it not only facilitates and expedites such gas absorption, but, due to the very thorough dispersion of the gas throughout the liquid by the beating or whipping action, the quality and particularly the uniformity of the foam is improved. By such procedure, stable foams of very low density and fine, uniform cell structure may be produced.

On the other hand, by utilizing the beating or whipping step, it is possible to make stable foam at pressures below those required when gas absorption induced by pressure alone is relied upon, unaided by beating or whipping. In some cases, it is only necessary to apply such pressures as are necessary to move the gas into the liquid at the desired rate, and to move the liquid and entrained gas through the closed system and to discharge the foam through the exit nozzle. In this connection, it will be understood that there is a pressure drop between the intake and discharge ends of the closed system. However, we have made satisfactory foam in cases where the maximum pressure in the system has not exceeded 50 lbs. per sq. in. and where, due to the pressure drop, the pressure at the discharge nozzle was in the neighborhood of 5 lbs. per sq. in. In such cases the foam results from the absorption caused by the combination of moderate pressure and the severe beating or whipping action. Nevertheless, it is stable.

Another step of important utility in the successful practice of the process is the chilling of the material while it is passing through the beating or whipping unit. Thus, as shown in Figs. 2 and 3, the treating cylinder 11 is surrounded by a second cylinder 15 which provides a heat exchange chamber 16 therebetween through which a refrigerant may be circulated. This not only serves to remove the heat generated by the work done on the material by the rotor and blades, but it also appears to serve a useful function in increasing the absorption of gas. Thus, when operating at any given pressure in the system, the cooler the exit temperature of the material as it leaves the treating cylinder 11, the lower the density of the foam which results. This affords a valuable control feature in actual continuous operations, for the density of the product may be adjusted by raising or lowering the exit temperature. This may be done by either varying the temperature of the refrigerant or by varying the rate at which the material is pumped through the system, or both. Ordinarily such exit temperatures vary between 15° and 65° F.

The method described herein is applicable to the foaming of polyvinyl chloride and copolymers of vinyl chloride with other polymerizable components which have been plasticized by the addition of liquid plasticizing agents in accordance with practices well known in the art to obtain a free flowing mass, frequently referred to in the art as a plastisol. Plastisols are considered to be dispersions of particulate polymer or copolymer dispersed but not dissolved in a plasticizer at room temperatures. Upon heating, the plasticizer dissolves the polymer and forms a cured plasticized vinyl chloride resin. Homopolymers and copolymers of vinyl chloride can be used to prepare plastisols for use in the practice of the method described herein. In employing copolymers of vinyl chloride, the copolymer should have a sufficiently high vinyl chloride content as to prevent substantial solvation of the polymer at room temperature by the plasticizer. Copolymers containing a major portion, i.e., greater than 50 percent by weight, of vinyl chloride polymerized in the polymer generally exhibit this lack of room temperature solubility in the plasticizer.

However, it is not critical that the vinyl chloride copolymers be of any specific polymeric structure. Copolymers of vinyl chloride with other polymerizable components, for example, ethylenically unsaturated monomers as lower alkyl vinyl esters, and particularly vinyl acetate, vinyl benzoate, lower alkyl acrylates, such as methyl acrylate, ethyl acrylate, butyl acrylate, octyl acrylate and the like as well as corresponding methacrylates, alkyl esters of unsaturated acids, such as maleic and fumaric acids, as well as other copolymerizable compounds such as polymerizable nitriles such as acrylonitrile, halogenated compounds such as vinylidene chloride and fluoride, vinyl fluoride, chlorotrifluoroethylene and like compounds, can be employed in practicing the method of this invention. Of the copolymers, we particularly prefer the vinyl chloride-vinyl acetate copolymers, and even more particularly, we prefer such copolymers containing at least 85 percent of vinyl chloride in the copolymers.

For most satisfactory use in plastisols, these vinyl chloride homopolymers and copolymers are preferably employed in a particle size in the range of about 0.10 to 1.0 micron. Superior and more effective plastisol compositions result. An effective way of securing such a particle size of the polymer is by emulsion polymerization, as is known in the art. Suitable methods of plasticizing such materials are disclosed in U.S. Patent No. 2,666,036, and other methods are known in the art.

Heretofore, in this specification the terms beat and whip (or beating and whipping) have been used alternatively, although synonymously, to describe the mechanical action to which the material is subjected, but hereinafter, and in the claims, the term beat (or beating) will be used alone to describe any form of severe mechanical action which when applied to gas entrained in plasticized vinyl resins serves to break up large gas bubbles into smaller bubbles or cells. Such action, for example, is readily obtained in a beating unit of the type disclosed, having a treating cylinder 11 with an inside diameter of 3″ and a length of 12″ with the rotor operating in the neighborhood of 555 r.p.m. With the use of such a beating unit, with the plasticized resin being pumped into the system at the rate of from 10 to 30 gals. per hour, and with refrigerant at a temperature to give the resin an exit temperature of from 15° to 65° F. as it leaves the unit, foam of good quality may be produced over a wide range of pressures maintained within the system. This makes for a flexibility of operation which is exceedingly useful in manufacturing, bearing in mind that vinyl resin compounds plasticized with certain plasticizers are more susceptible to absorption of gas than compounds plasticized with other plasticizers. Moreover, certain additives, such as surface active agents, have been found useful in cases where it is desirable to produce foam having a very fine (small) cell structure. For example, the addition to the compounds of very small quantities (from ¼ to ½ of one percent of the compound, by weight) of sodium dioctyl sulfosuccinate or soybean lecithin will reduce the size of the individual cells. With some compounds which are resistant to gas absorption it is possible by the present method to obtain low density foams of good quality without employing the very high pressures otherwise required. On the other hand, with compounds which absorb gas readily, medium or high density foams of good quality may be obtained at very low pressures, and low density foams of good quality may be obtained at lower pressures than would otherwise be required.

It will be understood that the invention may be variously modified and embodied within the scope of the subjoined claims.

What is claimed is:

1. The method of producing by gas absorption a cellular structure in a resin selected from the group consisting of polyvinyl chloride and copolymers of vinyl chloride and an ethylenically unsaturated monomer dispersed in sufficient liquid plasticizer to provide a free flowing mass, in which a mass of such material is moved through a closed system filled with such material and extending from a source of resin supply to a discharge nozzle, which comprises first injecting an excess of inert gas under pressure into said moving mass of material in such manner that relatively large bubbles of unabsorbed gas are entrained with said moving mass of material, maintaining the gas pressure throughout said system of at least 5 lbs. per sq. in., thereafter subjecting said moving mass of material and entrained gas within the system to a severe mechanical beating action which thoroughly breaks up said bubbles of gas into smaller bubbles and thoroughly disperses the gas throughout the material in the form of minute cells which are entrained in the material whereby additional absorption of the gas in the mass is effected, and discharging said gas absorbed material from said nozzle in ungelled state to form an expanded, creamy foam.

2. The method set forth in claim 1 in which said moving mass of material is chilled while being subjected to said mechanical beating action.

3. The method set forth in claim 1 in which said moving mass is chilled to a temperature between 15° and 65° F. while being subjected to said mechanical beating action.

4. The method set forth in claim 1 in which the pressure of said gas exceeds 100 lbs. per sq. in. so as to facilitate absorption of the dispersed gas contained in said minute cells.

5. A method for producing by gas absorption a cellular structure of a polyvinyl chloride resin dispersed in sufficient liquid plasticizer to provide a free flowing mass, in which a mass of such material is moved through a closed system filled with such material and extending from a source of resin supply to a discharge nozzle, which comprises first injecting an excess of inert gas under pressure into said moving mass of material in such manner that relatively large bubbles of unabsorbed gas are entrained with said moving mass of material, maintaining the gas pressure throughout said system of at least 5 lbs. per sq. in., thereafter subjecting said moving mass of material and entrained gas within the system to a severe mechanical beating action which thoroughly breaks up said bubbles of gas into smaller bubbles and thoroughly disperses the gas throughout the material in the form of minute cells which are entrained in the material whereby additional absorption of the gas in the mass is effected, and discharging said gas absorbed material from said nozzle in ungelled state to form an expanded, creamy foam.

6. A method for producing by gas absorption a cellular structure in a vinyl chloride-vinyl acetate copolymer dispersed in sufficient liquid plasticizer to provide a free flowing mass, in which a mass of such material is moved through a closed system filled with such material and extending from a source of resin supply to a discharge nozzle, which comprises first injecting an excess of inert gas under pressure into said moving mass of material in such manner that relatively large bubbles of unabsorbed gas are entrained with said moving mass of material, maintaining the gas pressure throughout said system of at least 5 lbs. per sq. in., thereafter subjecting said moving mass of material and entrained gas within the system to a severe mechanical beating action which thoroughly breaks up said bubbles of gas into smaller bubbles and thoroughly disperses the gas throughout the material in the form of minute cells which are entrained in the material whereby additional absorption of the gas in the mass is effected, and discharging said gas absorbed material from said nozzle in ungelled state to form an expanded, creamy foam.

No references cited.